United States Patent [19]

Isayama et al.

[11] 4,300,144
[45] Nov. 10, 1981

[54] MULTIPLE-NOZZLE INK-JET RECORDING APPARATUS

[75] Inventors: Takuro Isayama; Hiroshi Yamazaki, both of Tokyo; Hiromichi Komai, Kawasaki; Tsutomu Sato, Yokohama, all of Japan

[73] Assignee: Ricoh Co., Ltd., Ota, Japan

[21] Appl. No.: 86,074

[22] Filed: Oct. 18, 1979

[30] Foreign Application Priority Data

Feb. 11, 1978 [JP] Japan ................................ 53-135431

[51] Int. Cl.³ ............................................. G01D 15/16
[52] U.S. Cl. ................................................ 346/140 R
[58] Field of Search .......................................... 346/140

[56] References Cited

U.S. PATENT DOCUMENTS

| 3,151,543 | 10/1964 | Preisinger | 346/141 X |
| 3,452,360 | 6/1969 | Williamson | 346/140 |
| 3,934,695 | 1/1976 | Kovalick | 346/76 PH X |
| 4,126,867 | 11/1978 | Stevenson | 346/140 |
| 4,189,734 | 2/1980 | Kyser | 346/140 X |

Primary Examiner—Joseph W. Hartary
Attorney, Agent, or Firm—Burgess, Ryan and Wayne

[57] ABSTRACT

In the pressure, on-demand type ink-jet printers or the like, the driving voltages applied to respective electrostrictive means of print head or nozzle units are shifted in time so that constructive interferences of sound waves produced by the pressure waves which in turn are generated by respective print head or nozzle units may be avoided, whereby the over-all intensity of sound waves and consequently noise may be remarkably suppressed.

3 Claims, 4 Drawing Figures

MULTIPLE-NOZZLE INK-JET RECORDING APPARATUS

BACKGROUND OF THE INVENTION

The present invention relates to a pressure, on-demand type ink-jet recording apparatus.

Because of their simple constructions, the pressure, on-demand type ink-jet heads have been applied in various fields. One example is a multiple-nozzle print head for copying machines. However, since the driving frequency is within the audio frequency range, sound waves of considerably high intensity are generated when the multiple-nozzle ink-jet heads are operated. In general, the intensity of sinusoidal sound waves is expressed by $$I = 2\pi^2 \rho v^2 V a^2$$

where
$v$ = the oscillation frequency;
$\rho$ = the density of air;
$a$ = the amplitude; and
$V$ = the velocity of sound.

It is seen that the intensity I is proportional to the square of the amplitude a. When there exists the number of n sinusoidal sound waves of the same amplitude, frequency and phase, the intensity In becomes $$In = 2\pi^2 \rho v^2 v(na)^2 = n^2 I$$

That is, the intensity is increased in proportion to the square of the number of sinusoidal sound waves. As a result, when constructive interferences of sound waves produces by the pressure waves which in turn are generated by respective print head or nozzle units should occur, slightly objectionable noise results.

SUMMARY OF THE INVENTION

In view of the above, the primary object of the present invention is to provide a pressure, on-demand type multiple-nozzle ink-jet recording apparatus which is simple in construction, may be fabricated at less costs and may operate with minimum noise.

DESCRIPTION OF THE PREFERRED EMBODIMENT

Figure 1:
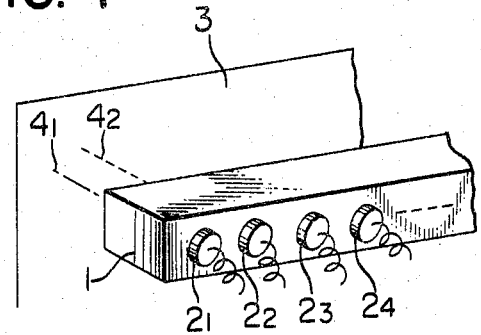
FIG. 1 is a schematic view of a multiple-nozzle print head of a pressure, on-demand type ink-jet recording apparatus.

In FIG. 1 is shown a multiple-nozzle print head of an on-demand type ink-jet printer having a casing 1 and a plurality of electrostrictive elements $2_1$, $2_2$, $2_3$, $2_4$ and so on. Ink drops $4_1$, $4_2$ and so on fly towards a recording medium 3.

Figure 2:
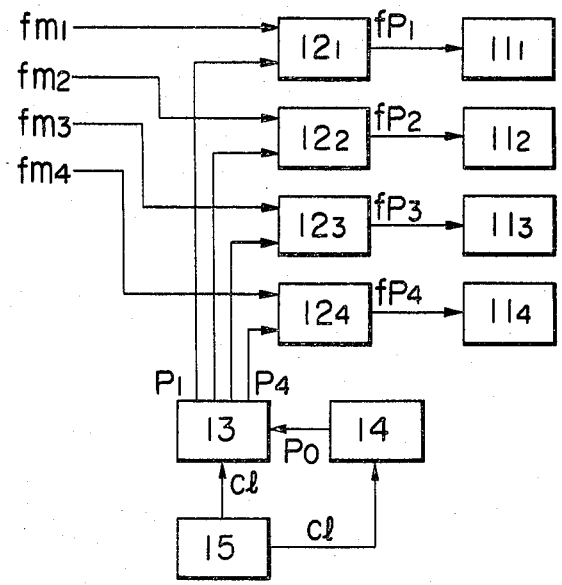
FIG. 2 is a block diagram of a preferred embodiment of the present invention.
Figure 4:
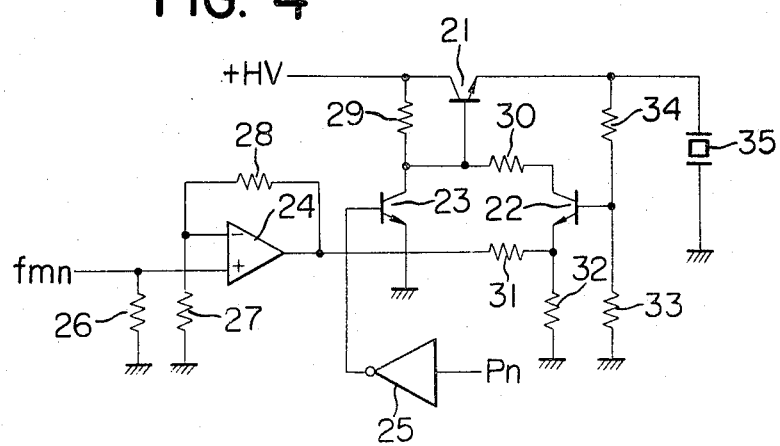
FIG. 4 is a diagram of a pulse amplitude modulation circuit.

In FIG. 2 is shown a block diagram of a first embodiment of the present invention. $11_1$ through $11_4$ are electrostrictive elements; $12_1$ through $12_4$ are drivers for driving the electrostrictive elements 12; 13 is a shift register; 14 is a pulse generator; 15, a clock pulse generator; $fm_1$ through $fm_4$ are image or print signals; and $fp_1$ through $fp_4$ are drive signals. In FIG. 4 only four print head units are shown, but it is to be understood that the print head may have any desired number of units.

Figure 3:
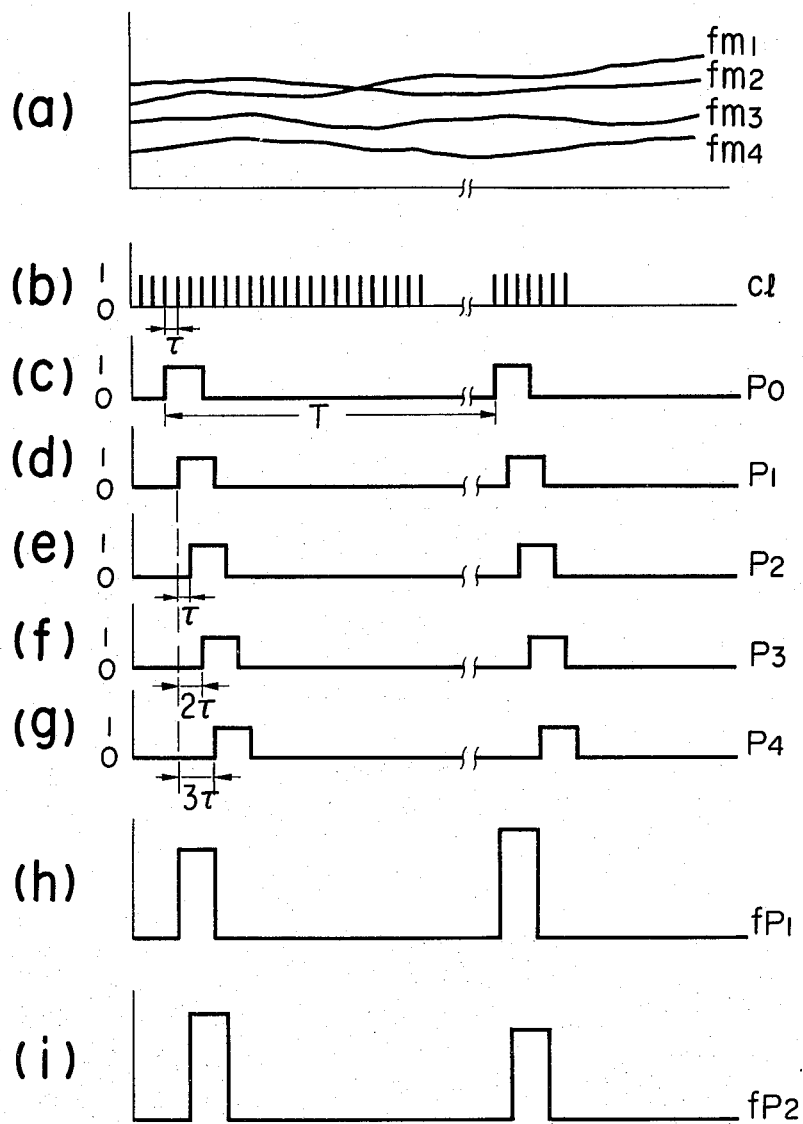
FIG. 3 shows a timing chart used for the explanation thereof.

In FIG. 3 is shown a timing chart used for the explanation of the mode of separation of the print head shown in FIG. 2. The print or image signals are shown at (a); the clock pulses, at (b); the output pulses from the shift register 13, at (c), (d), (e), (f) and (g); and the drive signals $fp_1$ and $fp_2$, at (h) and (i), respectively. The clock pulses $c_1$ have a pulse spacing $\tau$ and the output pulses $p_0$ through $p_4$ from the shift register 13 are spaced apart by T.

Referring to FIGS. 2 and 3, the mode of operation will be described. The pulse generator 14 generates a train of pulses $p_0$ of a predetermined repetition rate and a predetermined pulse duration which is in turn applied to the shift register 13. In response to the clock pulse $c_1$ from the clock pulse generator 15, the pulse $p_0$ are shifted in the shift register 13 so that the output pulses $p_1$ through $p_4$ are derived as shown at (d) through (g) and used to sample the image or print signals $fm_1$ through $fm_4$ to be applied to the print head units. That is, the image or print signals fm amplitude modulate the pulses fp to derive the drive signals $fp_1$, $fp_2$ and so on as shown at (h) and (i).

In FIG. 4 is shown a diagram of a pulse amplitude modulation circuit for deriving the drive signals fp. 21 through 23 are transistors; 24, an operational amplifier; 25, an inverter; 26 through 34, resistors; and 35, an electrostrictive element.

When no pulse signal pn from the shift register 13 is applied to the inverter, the transistor 23 is maintained conductive so that the base of the transistor 21 is grounded and consequently the transistor 21 is cut off. As a result no voltage is applied across the electrostrictive element 35. But when the output pulse Pn is applied to the inverter 25, the transistor 23 is disabled while the transistor 21 is enabled so that a voltage is applied across the electrostrictive element 35. When the image or print signal fmn is applied to the noninverting input terminal of the operational amplifier, an output signal is derived whose magnitude is dependent upon the ratio between the resistors 27 and 28 and is applied to the emitter of the transistor 22. The transistor 22 controls the transistor 21 in such a way that the voltages across the resistors 32 and 33 may be equal to each other so that the output signal which is proportional to the image signal fmn is derived from the transistor 21 and applied across the electrostrictive element 35. Thus when the output pulse Pn is applied to the inverter 25, a voltage proportional to the image or print signal fmn is applied across the electrostrictive element 35.

As shown in FIGS. 3(h) and (i), the driving voltages fpn are shifted in time so that when the recording medium 3 is moved continuously relative to the print head 1 or vice versa, the print head units must be so arranged as to eliminate the distortions of printed images. Therefore each print head unit is inclined relative to the direction perpendicular to the direction of the transport of the recording medium 3 by an angle $\theta$ $$\theta = \tan^{-1} \tau v / l_1$$

where $v$ = the relative speed between the print head 1 and the recording medium 3, and
$l_1$ = the spacing between the print head units.

In summary, according to the present invention, the driving voltages fpn are shifted in time so that no constructive interferences among the ultrasonic sound waves generated by the electrostrictive elements $11_n$ or 35 will occur. As a result the over-all intensity of ultrasonic sound generated by the ink-jet printer may be considerably reduced, whereby remarkable noise reduction may be attained.

What is claimed is:

1. A multiple-nozzle ink-jet recording apparatus, comprising:
   a plurality of print head units each provided with an electrostrictive ink ejection means;
   a corresponding plurality of electrical drive circuits, each drive circuit having an input terminal for receiving a corresponding image or print signal and an output terminal coupled to a corresponding one of said electrostrictive means; and
   timing control means coupled to all of said drive circuits for sequentially enabling the same, said timing control means operating at a given clock frequency and causing said drive circuits to actuate the corresponding electrostrictive means out of phase with each other, so that any resulting audio frequency or ultrasonic vibrations of said print heads are out of phase with each other, and combine to produce a composite sound or ultrasonic noise level of substantially less amplitude than would otherwise be produced.

2. The apparatus according to claim 1, wherein said timing control means comprises a clock pulse generator, another pulse generator coupled thereto, and a shift register coupled to said clock pulse generator for shifting the pulses generated by said other pulse generator.

3. A multiple-nozzle ink-jet recording apparatus as set forth in claim 2, wherein said other pulse generator comprises:
   a first transistor which is enabled in response to each clock pulse from said clock pulse generator; and
   a second transistor which is enabled in response to said image or print signal,
   whereby a pulse is applied to said shift register each time both said first and second transistors are enabled.

* * * * *

UNITED STATES PATENT AND TRADEMARK OFFICE
CERTIFICATE OF CORRECTION

PATENT NO.   :   4,300,144
DATED        :   November 10, 1981
INVENTOR(S)  :   Takuro Isayama, et al It is certified that error appears in the above—identified patent and that said Letters Patent is hereby corrected as shown below:

On the title page:
Item [73]: The address of Ricoh Co., Ltd. should be changed from "Ota, Japan" to --Tokyo, Japan--.

On the title page:
Item [30]: The priority date should be changed from "Feb. 11, 1978" to November 2, 1978--.

Column 1, line 34: "produces" should be --produced--.

Signed and Sealed this

Twenty-sixth Day of July 1983.

[SEAL]

Attest:

GERALD J. MOSSINGHOFF

Attesting Officer          Commissioner of Patents and Trademarks